United States Patent
Jiang et al.

(10) Patent No.: US 11,195,107 B1
(45) Date of Patent: Dec. 7, 2021

(54) METHOD OF MALICIOUS SOCIAL ACTIVITY PREDICTION USING SPATIAL-TEMPORAL SOCIAL NETWORK DATA

(71) Applicant: HRL Laboratories, LLC, Malibu, CA (US)

(72) Inventors: Qin Jiang, Oak Park, CA (US);
Kang-Yu Ni, Calabasas, CA (US);
Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 182 days.

(21) Appl. No.: 16/705,219

(22) Filed: Dec. 5, 2019

Related U.S. Application Data

(63) Continuation-in-part of application No. 16/294,815, filed on Mar. 6, 2019, now Pat. No. 10,748,063, and
(Continued)

(51) Int. Cl.
*G06N 5/04* (2006.01)
*G06N 5/02* (2006.01)
(Continued)

(52) U.S. Cl.
CPC .................. *G06N 5/04* (2013.01); *G06N 5/02* (2013.01); *G06Q 50/01* (2013.01); *G06Q 50/265* (2013.01); *H04L 67/18* (2013.01); *H04L 67/22* (2013.01)

(58) Field of Classification Search
CPC ............ G06N 5/04; G06N 5/02; G06Q 50/01; G06Q 50/265; H04L 67/18; H04L 67/22
(Continued)

(56) References Cited

U.S. PATENT DOCUMENTS

| | | | | | |
|---|---|---|---|---|---|
| 5,528,516 | A | * | 6/1996 | Yemini | ............... G06F 11/2257 702/181 |
| 5,661,668 | A | * | 8/1997 | Yemini | ............... G06F 11/2257 702/186 |

(Continued)

OTHER PUBLICATIONS

N-K. Ni and T-C. Lu, Information Dynamic Spectrum Characterizes System Instability toward Critical Transitions, EPJ Data Science, 3:28, 2014, pp. 1-25.

(Continued)

*Primary Examiner* — Hai V Nguyen
(74) *Attorney, Agent, or Firm* — Tope-McKay & Associates

(57) ABSTRACT

Described is a system for predicting future social activity. The system extracts social activities from spatial-temporal social network data collected in a first time period ranging from hours to days to capture spatial structures of social activities in a graph network representation. A graph matching technique is applied over a set of spatial-temporal social network data collected in a second time period ranging from weeks to months to capture temporal structures of the social activities. A spatial-temporal structure of each social activity is represented as an activity core, where each activity core is defined as active nodes that participate in the social activity with a frequency over a predetermined threshold over the second time period. For each activity core, the system computes statistics of the social activity and uses the statistics to generate a prediction of future behaviors of the social activity.

18 Claims, 19 Drawing Sheets

Related U.S. Application Data a continuation-in-part of application No. 16/034,139, filed on Jul. 12, 2018, now Pat. No. 10,528,600.

(60) Provisional application No. 62/802,089, filed on Feb. 6, 2019, provisional application No. 62/659,085, filed on Apr. 17, 2018, provisional application No. 62/557,944, filed on Sep. 13, 2017.

(51) Int. Cl.
  *H04L 29/08* (2006.01)
  *G06Q 50/26* (2012.01)
  *G06Q 50/00* (2012.01)

(58) Field of Classification Search
  USPC .............................................. 706/25, 46, 48
  See application file for complete search history.

(56) References Cited

U.S. PATENT DOCUMENTS

| | | | | |
|---|---|---|---|---|
| 5,796,611 A * | 8/1998 | Ochiai | G01W 1/10 | 702/3 |
| 5,892,517 A * | 4/1999 | Rich | G06T 1/60 | 345/582 |
| 6,249,755 B1 * | 6/2001 | Yemini | G06F 11/2257 | 702/183 |
| 6,324,679 B1 * | 11/2001 | Raghunathan | G06F 30/30 | 716/133 |
| 6,678,421 B1 * | 1/2004 | Daniell | H04N 19/647 | 382/238 |
| 7,397,916 B2 * | 7/2008 | Johnson | G06F 21/14 | 380/28 |
| 7,809,135 B2 * | 10/2010 | Johnson | H04L 9/0631 | 380/44 |
| 8,271,412 B2 * | 9/2012 | Johnson | H04L 41/12 | 706/46 |
| 8,392,400 B1 * | 3/2013 | Ransil | G06F 16/245 | 707/716 |
| 8,494,985 B1 * | 7/2013 | Keralapura | H04L 63/12 | 706/12 |
| 8,577,817 B1 * | 11/2013 | Keralapura | G06N 20/00 | 706/13 |
| 8,775,411 B1 * | 7/2014 | Ransil | G06F 16/24557 | 707/716 |
| 8,964,548 B1 * | 2/2015 | Keralapura | H04L 43/026 | 370/235 |
| 9,043,905 B1 * | 5/2015 | Allen | G06F 21/552 | 726/22 |
| 9,147,072 B2 * | 9/2015 | Fawaz | G06F 21/552 | |
| 9,218,563 B2 | 12/2015 | Szatmary et al. | | |
| 9,258,666 B2 * | 2/2016 | Agrawal | H04W 36/30 | |
| 9,443,521 B1 * | 9/2016 | Olguin | G10L 17/00 | |
| 9,479,405 B1 * | 10/2016 | Tongaonkar | H04L 43/04 | |
| 9,552,384 B2 * | 1/2017 | Narasimha | G06F 16/24561 | |
| 9,609,010 B2 * | 3/2017 | Sipple | H04L 63/1425 | |
| 9,659,564 B2 * | 5/2017 | Arslan | G10L 17/26 | |
| 9,672,468 B2 * | 6/2017 | Smith | H04L 51/20 | |
| 9,767,489 B1 * | 9/2017 | Liu | H04L 67/22 | |
| 9,792,551 B1 * | 10/2017 | Lu | G06N 5/02 | |
| 9,916,843 B2 * | 3/2018 | Togawa | G10L 25/06 | |
| 9,946,876 B2 * | 4/2018 | Wojnowicz | G06F 21/565 | |
| 9,979,738 B2 * | 5/2018 | Holland | H04W 12/122 | |
| 10,003,985 B1 * | 6/2018 | Holland | H04L 41/147 | |
| 10,038,703 B2 * | 7/2018 | Liu | H04L 63/1416 | |
| 10,049,336 B2 * | 8/2018 | Olguin | G06Q 50/01 | |
| 10,073,521 B2 * | 9/2018 | Kim | G10L 25/48 | |
| 10,089,360 B2 * | 10/2018 | Narasimha | G06F 16/24568 | |
| 10,091,218 B2 * | 10/2018 | Holland | G06N 20/10 | |
| 10,110,976 B2 * | 10/2018 | Bell | H04Q 9/00 | |
| 10,172,064 B2 * | 1/2019 | Agrawal | H04W 8/08 | |
| 10,217,465 B2 * | 2/2019 | Grahm | G10L 15/26 | |
| 10,404,554 B2 * | 9/2019 | Tongaonkar | H04L 43/04 | |
| 10,574,695 B2 * | 2/2020 | Jeng | H04L 63/14 | |
| 10,643,141 B2 * | 5/2020 | Laptev | G06N 7/005 | |
| 2003/0204370 A1 * | 10/2003 | Yemini | G06F 11/2257 | 702/183 |
| 2004/0139340 A1 * | 7/2004 | Johnson | G09C 1/00 | 713/194 |
| 2005/0137832 A1 * | 6/2005 | Yemini | G06F 11/2257 | 702/183 |
| 2006/0140401 A1 * | 6/2006 | Johnson | H04L 9/0625 | 380/44 |
| 2008/0127338 A1 * | 5/2008 | Cho | G06F 21/566 | 726/22 |
| 2009/0024549 A1 * | 1/2009 | Johnson | H04L 41/12 | 706/46 |
| 2009/0327270 A1 * | 12/2009 | Teevan | G06F 16/337 | |
| 2010/0332574 A1 * | 12/2010 | Herbert | H04L 9/0861 | 708/251 |
| 2012/0096558 A1 * | 4/2012 | Evrard | G06F 21/577 | 726/25 |
| 2014/0053248 A1 * | 2/2014 | Hulusi | G06F 21/44 | 726/4 |
| 2014/0105174 A1 * | 4/2014 | Agrawal | H04L 67/1097 | 370/331 |
| 2014/0155706 A1 * | 6/2014 | Kochs | A61B 5/02405 | 600/301 |
| 2015/0074026 A1 | 3/2015 | Szatmary et al. | | |
| 2015/0101053 A1 * | 4/2015 | Sipple | H04L 63/1425 | 726/24 |
| 2015/0121524 A1 * | 4/2015 | Fawaz | G06F 21/552 | 726/23 |
| 2016/0045128 A1 * | 2/2016 | Sitt | A61B 5/291 | 600/409 |
| 2016/0095041 A1 * | 3/2016 | Agrawal | H04W 36/30 | 370/332 |
| 2016/0143594 A1 * | 5/2016 | Moorman | A61B 5/4842 | 705/2 |
| 2016/0328432 A1 * | 11/2016 | Raghunathan | G06F 16/2264 | |
| 2016/0371267 A1 * | 12/2016 | Narasimha | G06F 16/24561 | |
| 2017/0012836 A1 * | 1/2017 | Tongaonkar | H04L 43/04 | |
| 2017/0068899 A1 * | 3/2017 | Laptev | G06N 7/005 | |
| 2017/0097960 A1 * | 4/2017 | Narasimha | G06F 16/24568 | |
| 2017/0220937 A1 * | 8/2017 | Wada | G06K 9/00 | |
| 2017/0308505 A1 * | 10/2017 | Ni | G06F 17/10 | |
| 2018/0075345 A1 | 3/2018 | Gottfried et al. | | |
| 2018/0100911 A1 * | 4/2018 | Bell | G06N 20/00 | |
| 2018/0100912 A1 * | 4/2018 | Bell | G06N 20/20 | |
| 2018/0103302 A1 * | 4/2018 | Bell | H04Q 9/00 | |
| 2019/0260204 A1 * | 8/2019 | Koval | G06N 3/126 | |
| 2020/0333767 A1 * | 10/2020 | Engelstein | H04Q 9/00 | |

OTHER PUBLICATIONS

J. Borge-Holthefer, N. Perra, B. Goncalves, S. Gonzalez-Bailon, A. Arenas, Y. Moreno, and A. Vespignani. The dynamics of information-driven coordination phenomena: A transfer entropy analysis, Science Advance, 2:5, e1501158, 2016, pp. 1-8.

C. E. Shannon, A Mathematical Theory of Communication. Bell System Technical Journal 27 (3): pp. 379-423, 1948.

T. Schreiber, Measuring information transfer. Phys Rev Lett 2000, 85(2): pp. 461-464, 2000.

Marschinski, Robert, and H. Kantz, Analysing the information flow between financial time series. The European Physical Journal B—Condensed Matter and Complex Systems 30.2, pp. 275-281, 2002.

Junior, Leonidas Sandoval, Asher Mullokandov, and Dror Y. Kenett. Dependency relations among international stock market indices. Journal of Risk and Financial Management 8.2, pp. 227-265, 2015.

Notice of Allowance for U.S. Appl. No. 16/034,139, dated Aug. 26, 2019.

Jiamin Li and Harold W. Lewis, "Fuzzy Clustering Algorithms—Review of the Applications," The Proceedings of 2016 IEEE International Conference on Smart Cloud, pp. 282-288, 2016.

Thomas Schreiber, "Measuring Information Transfer" Physical Review Letters, vol. 85, No. 2, pp. 461-464, Jul. 2000.

Notification of Transmittal of International Search Report and the Written Opinion of the International Searching Authority for PCT/US2019/021049; dated Jun. 21, 2019.

(56) References Cited

OTHER PUBLICATIONS

International Search Report of the International Searching Authority for PCT/US2019/021049; dated Jun. 21, 2019.
Written Opinion of the International Searching Authority for PCT/US2019/021049; dated Jun. 21, 2019.
Qiuwen Chen et al. 'Real-time anomaly detection for streaming data using burst code on a neurosynaptic processor', Design, Automation & Test in Europe Conference & Exhibition (DATE), 2017.
Subutai Ahmad et al. 'Real-Time Anomaly Detection for Streaming Analytics', arXiv:1607.02480v1, Jul. 8, 2016.
Andrew S. Cassidy et al. 'TrueNorth: a High-Performance, Low-Power Neurosynaptic Processor for Multi-Sensory Perception, Action, and Cognition', Technical Report, IBM ResearchAlmaden Research Center San Jose United States, 2016.
J. Bill, L. Buesing, S. Habenschuss, B. Nessler, W. Maass, and R. Legenstein. Distributed bayesian computation and self-organized learning in sheets of spiking neurons with local lateral inhibition. PloS one, 10(8):e0134356, 2015, pp. 1-51.
Song et al., "Competitive Hebbian Learning through Spike-Timing-Dependent Synaptic Plasticity" in Nature Neuroscience 3, pp. 919-926.
Notice of Allowance for U.S. Appl. No. 16/294,815, dated Apr. 16, 2020.
A. Sarajedini, et al., "Conditional probability density function estimation with sigmoidal neural networks," IEEE Trans. on Neural Networks, vol. 10, No. 2, Mar. 1999, pp. 231-238 (Year: 1999).

\* cited by examiner

METHOD OF MALICIOUS SOCIAL ACTIVITY PREDICTION USING SPATIAL-TEMPORAL SOCIAL NETWORK DATA

CROSS-REFERENCE TO RELATED APPLICATIONS

The present application is a Continuation-in-Part application of U.S. application Ser. No. 16/294,815, filed in the United States on Mar. 6, 2019, entitled, "A Neuronal Network Topology for Computing Conditional Probabilities," which is a Non-Provisional Application of U.S. Provisional Application No. 62/659,085, filed in the United States on Apr. 17, 2018, entitled, "A Neuronal Network Topology for Computing Conditional Probabilities," the entirety of which are incorporated herein by reference.

The present application is ALSO a Continuation-in-Part application of U.S. application Ser. No. 16/034,139, filed in the United States on Jul. 12, 2018, entitled, "System to Identify Unknown Communication Behavior," which is a Non-Provisional Application of U.S. Provisional Application No. 62/557,944, filed in the United States on Sep. 13, 2017, entitled, "Identify Unknown Communication Behavior Relationships from Time Series and Detect their Changes," the entirety of which are incorporated herein by reference.

The present application is ALSO a Non-Provisional Application of U.S. Provisional Application No. 62/802,089, filed in the United States on Feb. 6, 2019, entitled, "A Method of Malicious Social Activity Prediction Using Spatial-Temporal Social Network Data," the entirety of which is incorporated herein by reference.

GOVERNMENT LICENSE RIGHTS

This invention was made with government support under U.S. Government Contract Number PC 1141899. The government may have certain rights in the invention.

BACKGROUND OF INVENTION

(1) Field of Invention

The present invention relates to a system for predicting malicious social activity, and more particularly, to a system for predicting malicious social activity using spatial-temporal social network data.

(2) Description of Related Art

Analyzing and understanding social networks is a challenging task because social networks possess spatial-temporal dynamics in high dimensional space. With the advance of technology, social network systems, including online communication systems, wireless communication networks, and global positioning system (GPS) localization systems, have become important and efficient tools for organizing social activities in human society. Today, human societies almost completely depend on social network systems for communications and social connections. Therefore, social network data provides plenty of information about social activities in human societies. Analyzing social network data will provide useful information for monitoring and predicting social activities.

Thus, a continuing need exists for techniques that are able to predict social activities, including malicious activities, using high dimensional spatial-temporal network data.

SUMMARY OF INVENTION

The present invention relates to a system for predicting malicious social activity, and more particularly, to a system for predicting malicious social activity using spatial-temporal social network data. The system comprises one or more processors and a non-transitory computer-readable medium having executable instructions encoded thereon such that when executed, the one or more processors perform multiple operations. The system extracts social activities from a set of spatial-temporal social network data collected in a first time period ranging from hours to days to capture spatial structures of social activities in a graph network representation, wherein the social activities are represented by clusters of nodes and connecting edges in the graph network representation. A graph matching technique is applied over a set of spatial-temporal social network data collected in a second time period ranging from weeks to months to capture temporal structures of the social activities. A spatial-temporal structure of each social activity as an activity core, wherein each activity core is defined as a set of active nodes that participate in the social activity with a frequency over a predetermined threshold over the second time period. For each activity core, statistics of the social activity are computed. Using the computed statistics, a prediction of future behaviors of the social activity is generated. The system then generates and transmits an alert regarding the prediction of future behaviors of the social activity.

In another aspect, the nodes of each cluster have similar active time periods and geolocations.

In another aspect, in applying the graph matching technique, the system matches edges between a pair of clusters; computes an edge matching score for all matched edges; and determines if the pair of clusters are matched by applying a thresholding technique.

In another aspect, in representing the spatial-temporal structure of each social activity, the system computes a participation profile for each active node within a cluster; and determines active nodes for the activity core by thresholding the participation profiles, wherein for an active node, its participation profile pi is computed according to the following:

$$pi = miM$$

where mi denotes a number of times in which the active node participates in the social activity, and M is a total number of times that the social activity occurs in the second time period.

In another aspect, in generating the prediction of future behaviors of the social activity, a prediction of where and when the social activity will occur is generated.

In another aspect, the predicted social activity is a malicious activity, and wherein the prediction is used by law enforcement to determine actions to take to prevent the malicious activity.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
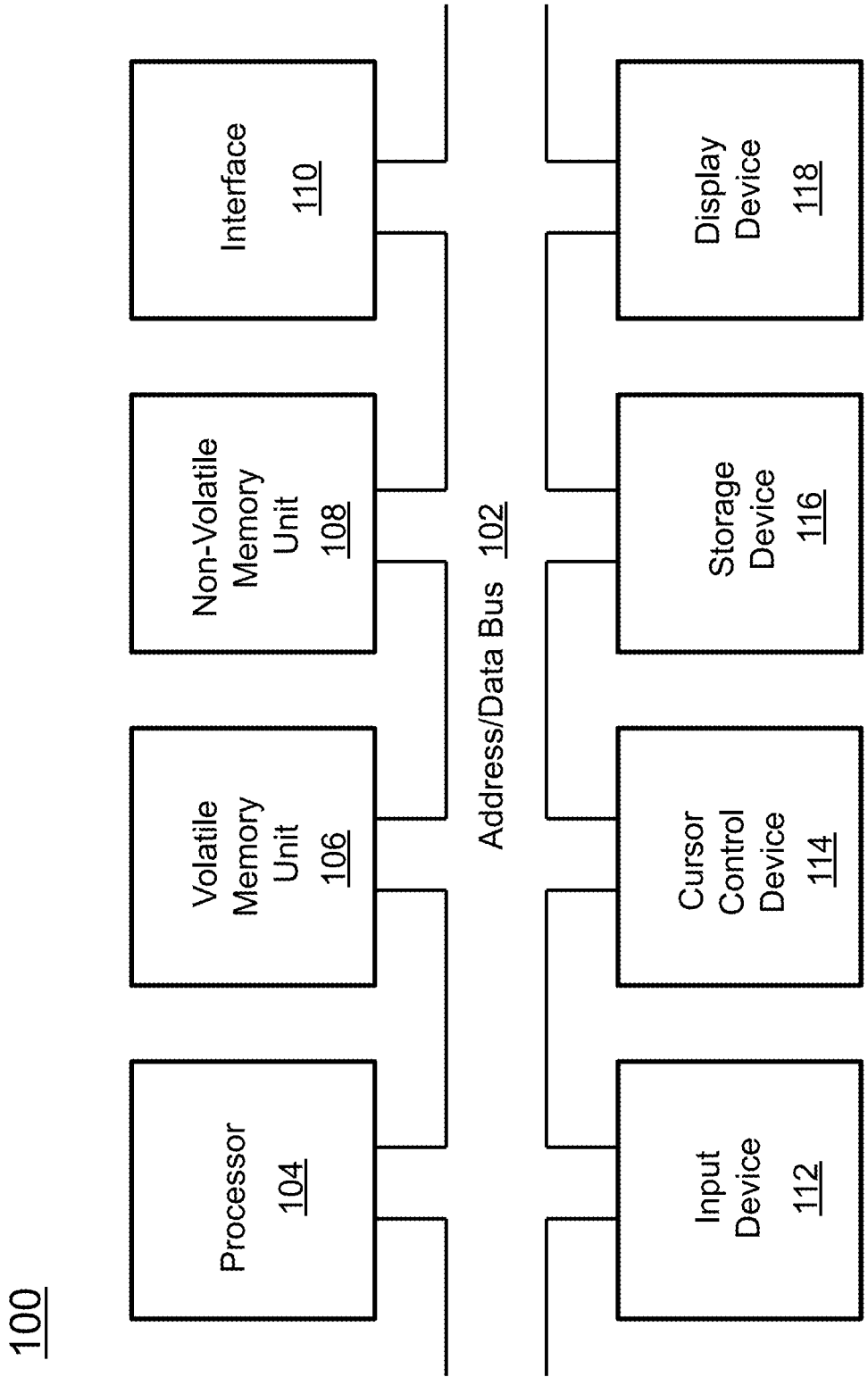
FIG. 1 is a block diagram depicting the components of a system for predicting malicious social activity according to some embodiments of the present disclosure.

The present invention relates to a system for predicting malicious social activity, and more particularly, to a system for predicting malicious social activity using spatial-temporal social network data. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for predicting malicious social activity. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
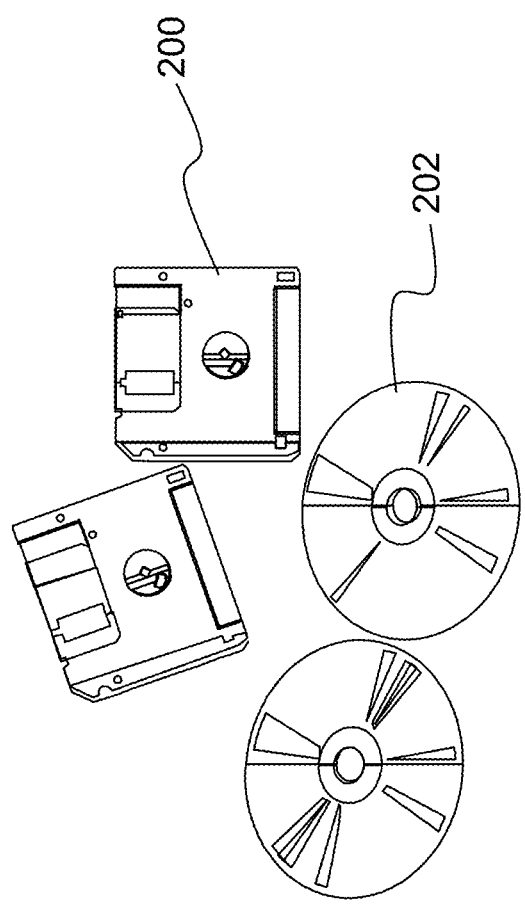
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

With the advance of technology, social network systems, including online communication systems, wireless communication networks, and global positioning systems (GPS) localization systems, have become important and efficient tools for organizing social activities in human society. Today, human societies almost completely depend on social network systems for communications and social connections. Therefore, social network data provides plenty of information about social activities in human societies. Analyzing social network data will provide useful information for monitoring and predicting social activities.

Described herein is a system and method to organize and analyze spatial-temporal social network data for predicting malicious social activities. Unique aspects of the system and method include (1) an approach to extract social activities (e.g., coordinated gatherings) from the data collected in a short-time period (e.g., hours, days) to capture spatial structures of social activities; (2) an approach to match social activities over a long-time period (e.g., weeks, months) to capture temporal structures of social activities; (3) a method of representing social activities with a core-nodes based dynamic structure; and (4) techniques to predict the behaviors of social networks, including geolocations and active times of social activities. The prediction system according to embodiments of the present disclosure was tested with simulated data sets, and experimental results show that the prediction system is effective to predict the behaviors of social activities and individual nodes in the social networks.

The invention described herein can be utilized to develop new techniques for analyzing complex spatial-temporal social network data for monitoring and predicting social activities, especially for malicious social activities, such as terrorist activity, drug dealer activity, and criminal gangster's activity. A major advantage of the invention is a framework to organize and analyze complex spatial-temporal social network data effectively, which is important for understanding and predicting the behaviors of social activities and individual persons with social network data.

Figure 3:
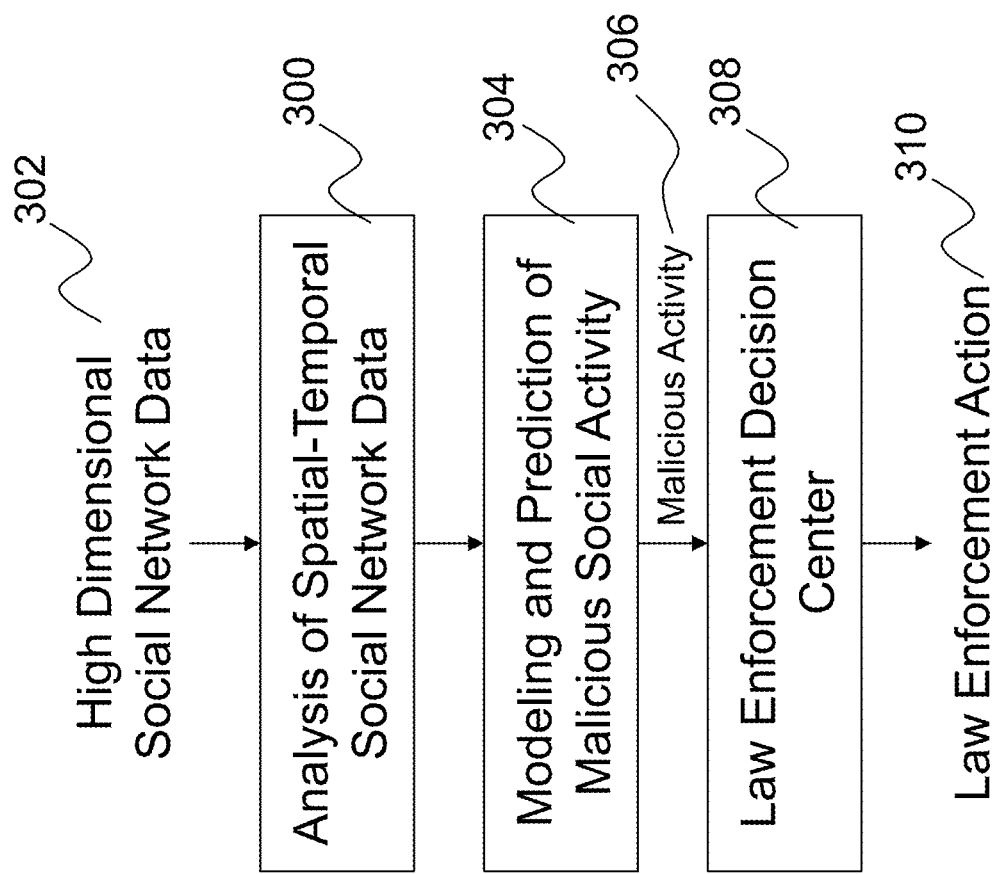
FIG. 3 is a diagram illustrating surveillance on malicious activity with social network data resulting in law enforcement action according to some embodiments of the present disclosure.

In one embodiment, the system described herein is a surveillance system that uses social network data to monitor/predict malicious social activities. FIG. 3 depicts a system diagram of the surveillance system. The system analyzes (element 300) the high dimensional social network data (element 302) collected from the activities/persons of interest to obtain the statistics/models for representing the activities/persons and predicts the future social behaviors of the activities/persons using the calculated statistics/models (i.e., modeling and prediction of malicious social activity (element 304)). The future social behaviors of the activities/persons (e.g., malicious activity (element 306)) can be used by law enforcement individuals and organizations (i.e., law enforcement decision center (element 308)) to take law enforcement actions (element 310) (e.g., arresting the individuals who participate in the malicious activity, protecting/monitoring the activity location) for preventing crimes/damages to human societies.

Social systems are highly dynamic, constantly changing in population sizes, communication structures and geolocations of social groups/communities in the social systems. Further, social systems may present multi-level dynamics. For instance, at micro-level (minutes to hours), social behavior patterns may be substantially different from ones at macro-level (months to years). As a result, social network data contains complex spatial-temporal behavior patterns at different time scales. Analyzing spatial-temporal behavior patterns of social network data will enable monitoring and prediction of social behavior patterns in social systems. In this disclosure, a method to compute the structures and statistics of social behavior patterns from spatial-temporal social network data and generate a prediction of social behavior patterns with the computed structures and statistics from the social network data is described. Social network data, including online contacts, mobile communication, and geolocation are high-dimensional real-time data streams. However, social activities (coordinated gatherings) are generally dense in small-time scales (minutes) but sparse in large time scales (month/year).

Figure 14:
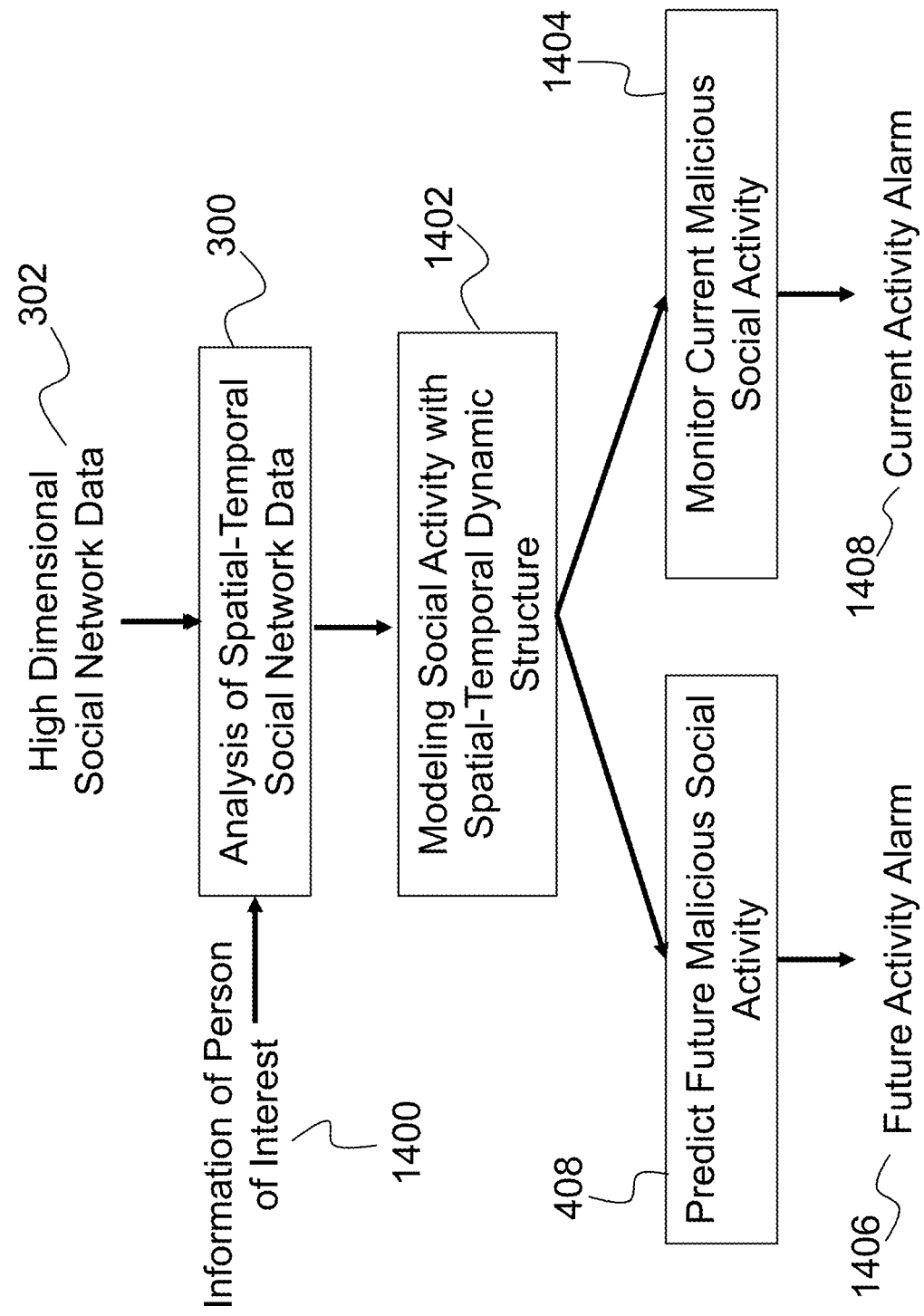
FIG. 14 is a diagram illustrating surveillance on malicious activity with social network data according to some embodiments of the present disclosure.

FIG. 14 depicts the system diagram of a generally surveillance system according to embodiments of the present disclosure. The system analyzes the high dimensional social network data (element 302) collected from the activities/persons of interest (element 1400) to obtain the statistics/models for representing the activities/persons (i.e., modeling social activity with spatial-temporal dynamic structure (element 1402)). The calculated statistics/models are used to monitor current activities (element 1404) and to predict future activities (element 408) as well. The input of the system are social network data (element 302) and the information of persons of interest (element 1400). Non-limiting examples of social network data (element 302) include email and text messages; mobile communications, including the geo positions/locations of communication users; communication messages sent by social media such as Facebook, Snapchat, and Twitter and Instagram. Non-limiting examples of information of persons of interest (element 1400) includes personal phone number, social media account, and email address. Social network data (element 302) contains communication messages and the information of communication user's locations while the personal information (element 1400) can be used to identify communication users. The outputs of the system are a future social activity alarm (element 1406) and/or a current social activity alarm (element 1408) with the geolocations and times of the activities.

Figure 4:
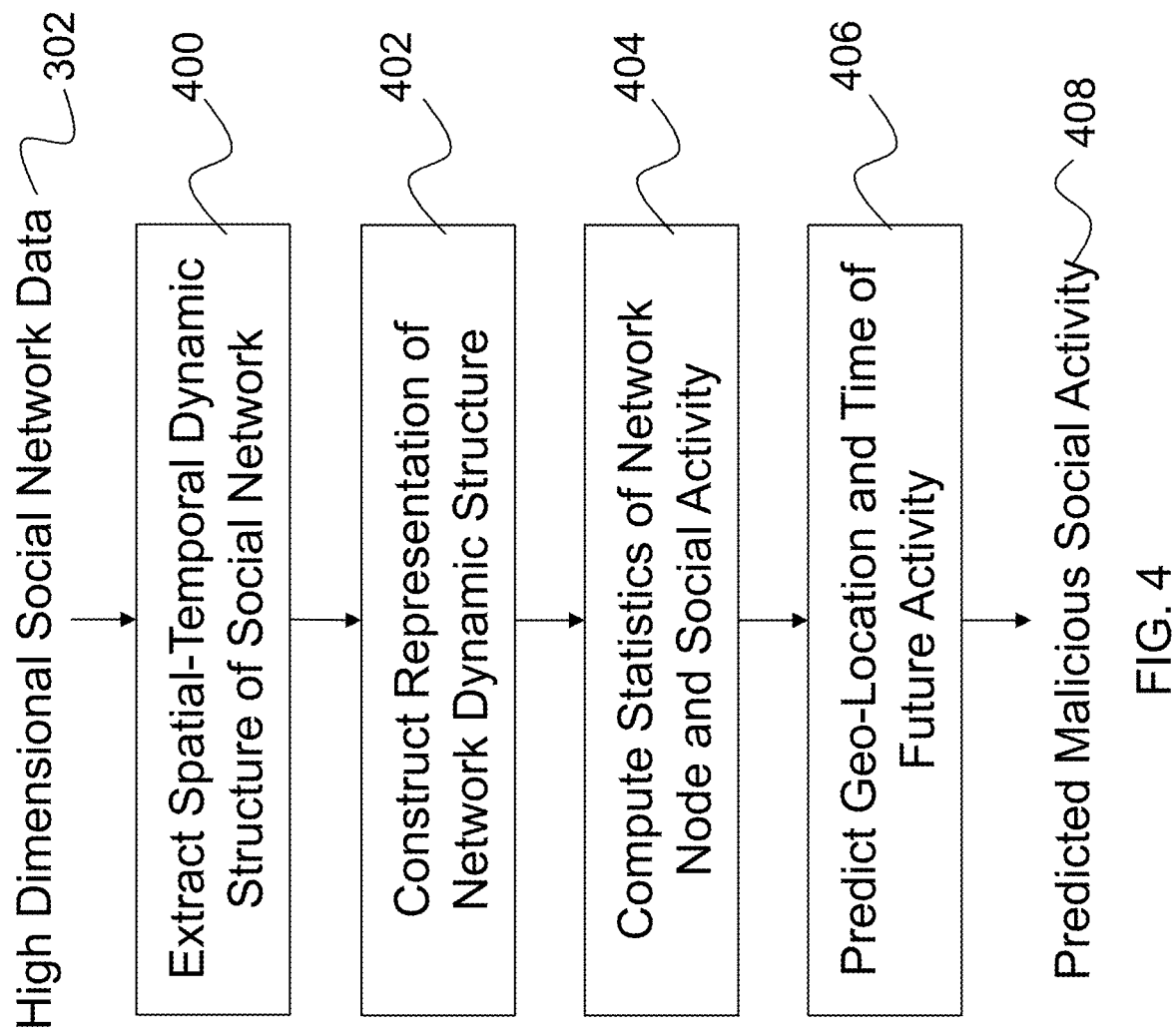
FIG. 4 is a diagram illustrating predicting malicious activity with social network data according to some embodiments of the present disclosure.

To represent the complex social structures in high-dimensional data, graph networks are used to represent high-dimensional social network data. In the approach described herein, each person is represented by one network node; the communication between two persons is represented by undirected network edges; and the communication signals between network nodes are represented by active time sequences for representing communication time periods and intensity. Then, dynamic structures of social patterns are extracted from graph network data and used to predict malicious social behaviors. FIG. 4 illustrates the system diagram of predicting malicious social activity using social network data. The input high dimensional social network data (element 302) contains the information of individual identification (ID), geolocation, and communication signals and is represented by graph network representation. The spatial-temporal dynamic structures are extracted from the graph data (element 400). The dynamic structures are represented by a core-node based social dynamic representation (element 402). The statistics of social behavior patterns are calculated from the core-node based representation (element 404). The future behaviors of malicious social activities are predicted (element 406) using the calculated statistics from social behavior patterns, and the predicted malicious social activity is output (element 408).

Figure 15:
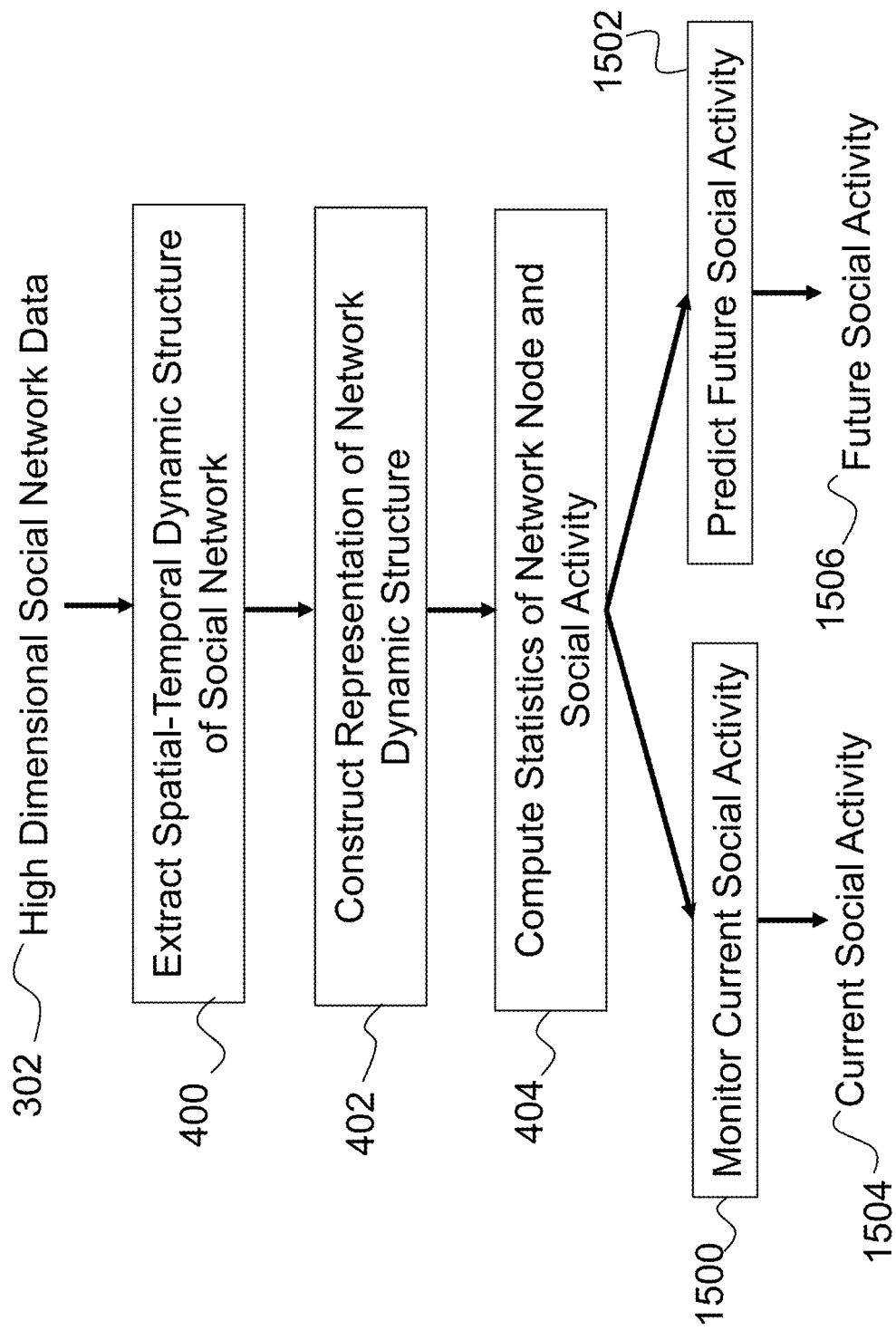
FIG. 15 is a diagram illustrating monitoring and predicting social activity with social network data according to some embodiments of the present disclosure.

FIG. 15 is a system diagram of monitoring and predicting social activity (e.g., malicious activity) with social network data. The operations are similar to those described above for FIG. 4 with the addition of monitoring current social activity (element 1500), predicting future social activity (element 1502), and generating outputs of the current social activity (element 1504) and predicted social activity (element 1506). The outputs can be in the form of an automatically generated textual and/or graphical description of the activity and participation profile (i.e., who is participating in the activity) sent to a display. In addition, the outputs may be in the form of a generated visual alarm or alert to a user regarding the activity, such as an automatically generated and transmitted email and/or text message.

(2.1) Extracting Spatial-Temporal Dynamic Structure of Social Network from Social Network Data (Element 400)

Figure 5:
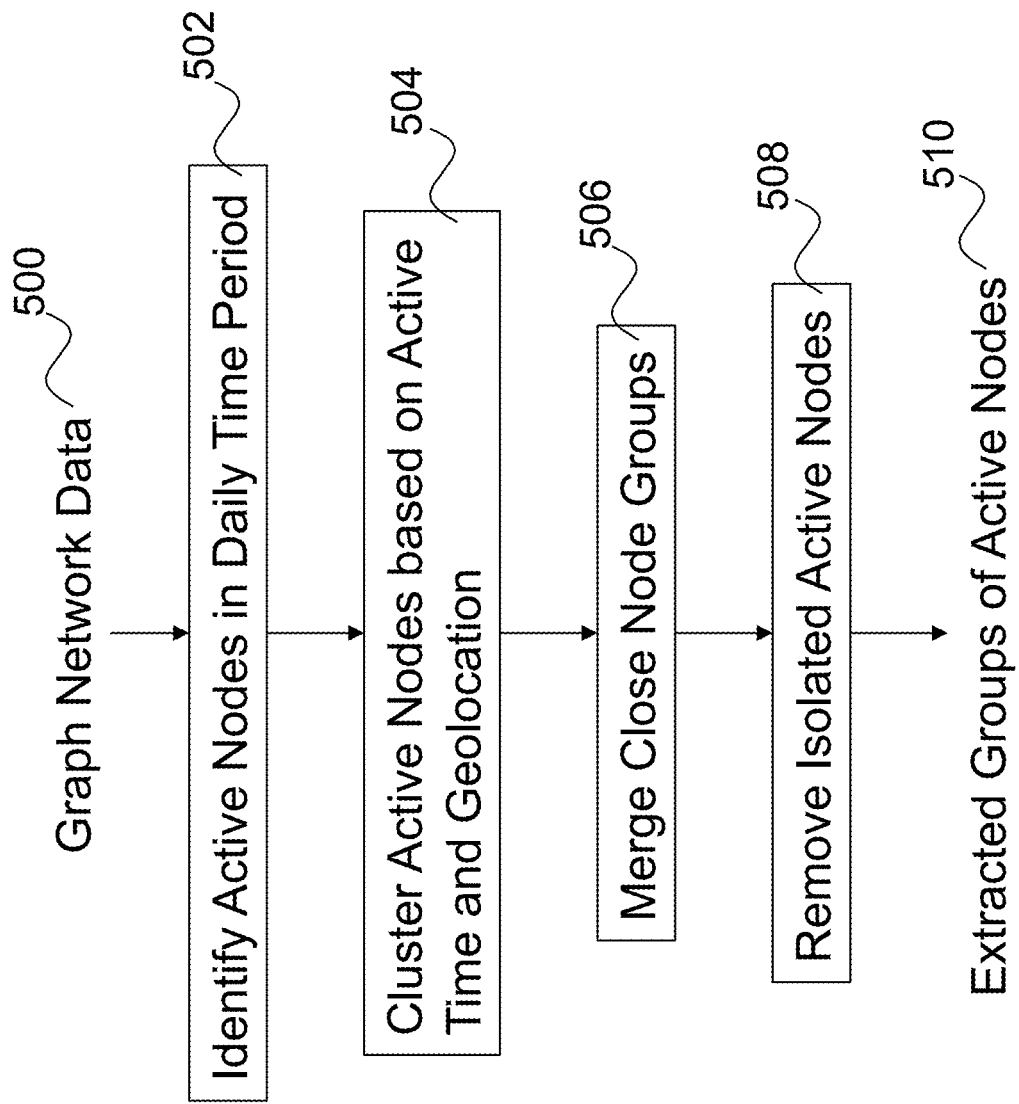
FIG. 5 is a diagram illustrating extracting social activity from daily social network data according to some embodiments of the present disclosure.

The key to understanding and modeling the behaviors of social networks is to identify and analyze activities in social networks, such as social gatherings or coordinated activities. Social activities generally occur in local areas and can be represented as sub-networks in graph network data. Additionally, the rich information of how social activities change over time in their geolocation, the people (nodes) involved, and how they interact can be captured by the spatial-temporal dynamic structures of network representation. In the approach according to embodiments of the present disclosure, to extract social activities, short-time network data (e.g., daily network data) is extracted and graphs of nodes are produced based on their active time and geolocation. This captures the spatial structures of the social activities, and from these graphs, graph matching is performed over long-time periods (weeks or months of network data) to capture temporal structures of individual social activities. FIG. 5 is a diagram depicting extracting social activities from daily social network data. As shown, from graph data (element 500), active nodes in the daily time period are identified (element 502). Active nodes are clustered based on active time and geolocation (element 504), and close node groups are merged (element 506). Isolated active nodes (i.e., active nodes not in close node groups) are removed (element 508), resulting in extracted groups of active nodes (element 510).

Let (N, E, T, LOC, COM) be the high-dimensional network data that contains five variables, where N denotes network nodes, E denotes network edges, T denotes active time, LOC denotes geolocations, and COM denotes communication signals. For a given daily time period, if a node's active time is within the given daily time period, the node is classified as an active node in the daily time period. For all of active nodes in a given day, the active times and geolocations are used to cluster the active nodes into groups/clusters. The node clustering is performed for every active time period. Specifically, for a time period Ti=tistart,tiend, there is a set of active nodes, Ni=ni1, . . . , nim and a set of geolocations, LOCi=posi1, . . . , posim. The fuzzy C-mean cluster algorithm is applied to the geolocation set LOCi with a larger number of centers, in a range from five to ten clusters. The fuzzy C-mean cluster algorithm is described by Li and Lewis in "Fuzzy Clustering Algorithms—Review of the Applications," The Proceedings of 2016 IEEE International Conference on Smart Cloud, pp. 282-288, 2016, which is hereby incorporated by reference as though fully set forth herein. After the clustering process, each cluster has a cluster center. Two clusters are merged if the distance between their centers is less than a pre-determined distance. In this case, the two clusters may represent the same social activity. The clustering process is repeated for every detected active time period for a given day. After completing the clustering for all active time periods, the clusters that have insignificant number of active nodes (e.g., less than three) are removed. The removed clusters correspond to isolated active nodes and are regarded as noise in the data. Finally, each of the remaining active node clusters represents a possible social activity (coordinated gathering), where the nodes of each cluster have the similar active time periods and geolocations.

A detected social activity may repeatedly/periodically occur during a long-time scale (weeks/months). To find the temporal structures of individual social activities, the same social activities over a long-time period need to be identified. Since social activities are changing in the number of participating nodes, their geolocation, and their structure over a long-time period, an attributed subgraph matching technique is used to match social activities over a longtime period. A social activity is represented by a subnetwork with a set of active nodes and connecting edges. The attributed subgraph matching technique uses node IDs and edges of two subnetworks to evaluate the similarity of the two subnetworks.

Figure 6:
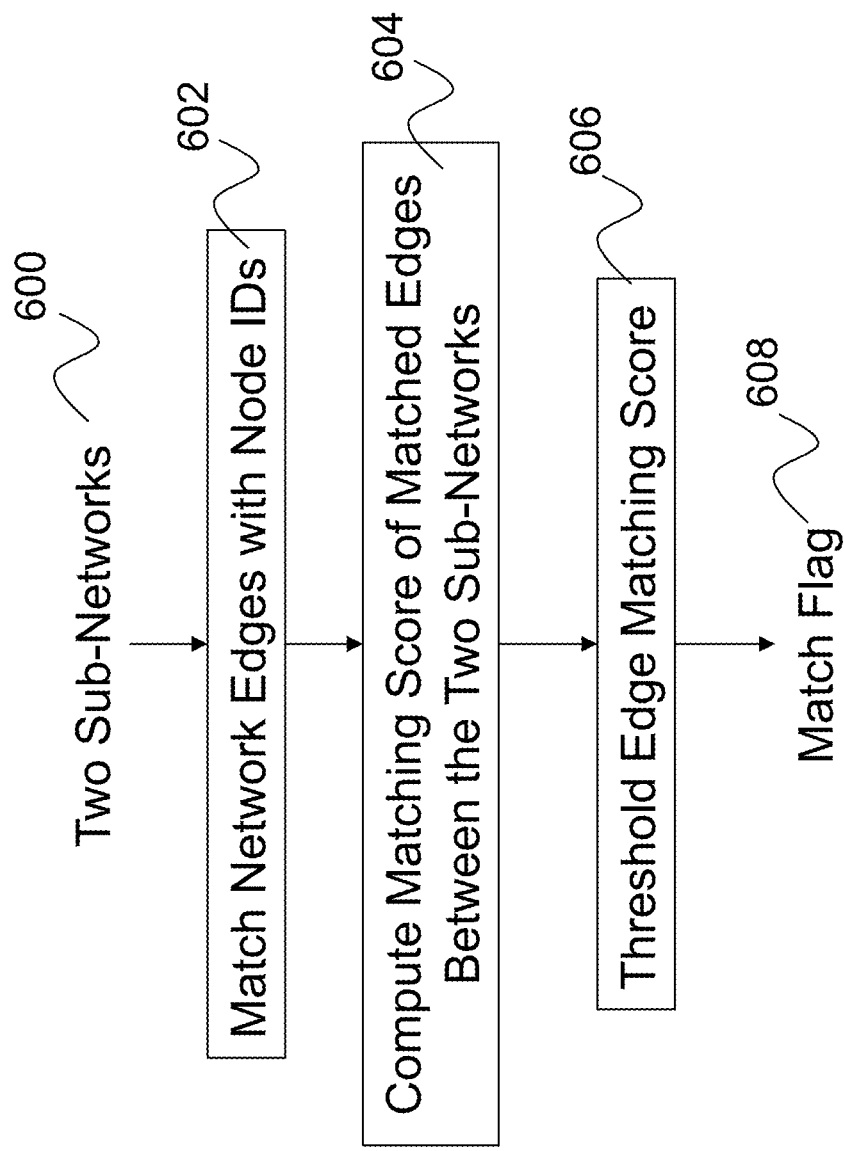
FIG. 6 is a diagram illustrating subgraph matching for evaluating the similarity of social activities according to some embodiments of the present disclosure.

FIG. 6 shows the procedure of the subgraph matching technique. For a pair of given clusters, CaNa,Ea and CbNb, Eb (from different days), or two sub-networks (element 600), the matching technique, at first, matches the network edges with node IDs between the two clusters (element 602), then computes an edge matching score for all matched edges (element 604). A thresholding technique is applied to the matching score (element 606) to determine if the two clusters are matched or not. Match flag (element 608) is one if the two clusters are matched, otherwise it is zero. Mathematically, the matching process is described as follows:

$$\forall eaij \in Ea \text{ and } \forall ebkl \in Eb$$

$$eaij=(nai,naj) \text{ and } ebkl=(nbk,nbl)$$

$$nax \in Na \text{ and } nbx \in Nb$$

If $nai=nbk$ and $naj=nbl$, then $eaij$ is matched with $ebkl$. (1)

In Equation (1), if two pairs of nodes, each pair from each cluster, have the same node IDs, the two edges defined by the two pairs of nodes are matched. If Eab represents the set of all matched edges between Ea and Eb, the matching score is calculated by the following equation:

$$Sm=Eab \text{ Min}(Ea,Eb), \qquad (2)$$

where the notation |E| represents the number of edges in the edge set E.

For a pre-determined threshold value, γ, the thresholding technique is described by:

$$\text{MatchFlag}=7 \text{ if } Sm \geq \gamma 0 \text{ Otherwise.} \qquad (3)$$

The threshold value from experimental studies is generally larger than 0.5, which means, at least, a half of the network edges in the two clusters are identical. Since social activities are dynamically changing over a long-time period, the number of network edges in an activity may change over the time period. Therefore, two clusters may not have the same number of network edges even though they represent the same social activity. After the activity matching process, for each social activity, a cluster set is obtained which is a record of when (i.e., what days) the activity occurred, where (i.e., geolocation) and who (i.e., nodes and their communication) participated, which represent the spatial-temporal dynamic structure of the social activity.

(2.2) Construct Representation of Spatial-Temporal Structure of a Social Activity (Element 402)

From a set of clusters that corresponds to a social activity, a method was developed to represent the spatial-temporal structure of the social activity, because the set of clusters may each have different numbers of participant nodes, geolocations, and connecting structures. To find a common factor from a set of clusters to represent a social activity, the concept of an activity core was used to characterize a social activity. An activity core is defined as a set of active nodes that participate in a social activity with a high frequency/probability (>90%) over a long-time period. To find an activity core, the participation profile for each active node within a cluster set was computed, and then the participation profiles were compared to a predetermined threshold to determine active nodes for an activity core. For a given node, ni, the participation profile is calculated by:

$$pi = mi/M, \quad (4)$$

where the variable mi is the number of times in which the node participates in a social activity, and M is the total number of times that the social activity occurs in a given long-time period. For a given social activity, if all participation profiles of the active nodes are computed, a distribution of participation profiles over the nodes is obtained. Thresholding on the distribution of participation profiles, all active nodes that form an activity core for the social activity can be found. For a given threshold value, θ, (>0.9), if $pi \geq \theta$, then ni is a core-node; otherwise, it is not a core-node.

Core-nodes are good indicators that a social activity will occur. For example, if multiple core-codes are present in a geolocation, one can predict, with high probability, that a certain social activity will occur. In addition, one can use the behaviors of several core nodes to predict behaviors of other core nodes. It is possible that some active nodes are core-nodes for several different social activities. Analyzing the history of core-nodes will help in understanding and predicting future social activities and individual nodes.

(2.3) Monitor Current Social Activity (Elements 1404 and 1500)

The core-nodes based social activity representation described herein enables identification and tracking/monitoring of social activities, including malicious social activities. If a person of interest is in the core nodes of a social activity, the activity is determined as a possible malicious social activity and the activity will be monitored and reported. An activity report includes the geolocation, time, and participation of the activity. The participation profile of a malicious activity also provides the information for finding new persons of interest. If a person participates in a possible malicious activity with a high frequency, for example $pi \geq 0.7$, the person is determined as a new person of interest.

(2.4) Compute Statistics of Social Activity and Predict Future Behavior (Elements 404, 408, and 1502)

With an activity core for a social activity, the statistics of the social activity can be computed, and the statistics can be used to predict future behaviors of the social activity. A primary goal of the invention according to embodiments of the present disclosure is to predict where (geolocation) and when (future time) malicious activities will occur.

To predict future activity time, the period of an activity is estimated from its core data computed from the history data, and the period is used to predict future activity time. Let Tact=t1, ..., tK be a set of activity interval times. The activity period is estimated by a weighted averaging method. Specifically, the activity period is estimated by:

$$Pact = 1Ki = 1Kw(i)ti \quad (5)$$

and $$wi = (1 - e - ai)j = 1K(1 - e - aj). \quad (6)$$

The weighting process is to give more weights to more recent data. The future active time of an activity is given by:

$$tfuture = tlast + Pact \pm \sigma act. \quad (7)$$

The variable σact is the variance of Tact, which provides a range of possible active times of a future activity.

For predicting the future geolocation of a criminal activity, for instance, the same principle of using mean values to make future predictions is used. Since each instance of a social activity corresponds to a cluster of active nodes, the averaged geolocations of the active nodes is used as the geolocation of the cluster. For a long-time scale, there is a set of clusters representing a social activity. From the cluster set, the mean value of cluster geolocation and its variance can be obtained. Then, the mean value and variance are used to construct a predicted range of future activity geolocation. Mathematically, let LOCact={(x1,y1, ..., (xK,yK)} be a set of cluster geolocations. Four statistic values are calculated from the data set:

$$xmean = mean \, xi \text{ and } ymean = mean(yi) \quad (8)$$

$$\sigma x = var(xi) \text{ and } \sigma y = var(yi) \quad (9)$$

The future geolocation of an activity is uniformly distributed in the following range:

$$xfuture \in uniform(xmean - \sigma x, xmean + \sigma x) \quad (10)$$

$$yfuture \in uniform(ymean - \sigma y, ymean + \sigma y). \quad (11)$$

For predicting individual's behaviors, the most important information is individual future geolocation and individual's arrival time to a future activity. In the network model, each node represents an individual person. The future geolocation of an active node is estimated by using Equations (8) through (11). Instead of using the cluster's geolocations to calculate the mean values, the active node's historical or previous geolocations are used in Equations (8) and (9), and then the future geolocations of the nodes are predicted using Equations (10) and (11).

The network data, (N, E, T, LOC, COM), has a set of active times, T, which contains the individual node's information of arrival times to social activities. Let Tarr= {Δt1, ..., ΔtK} be a set of time differences of an active Δti=tarrival−tactivity. The statistics of the time differences are calculated by:

$$\Delta tmean = mean(\Delta ti) \text{ and } \sigma \Delta = var(\Delta ti). \quad (12)$$

The future arrival time difference of an individual node is calculated by:

$$\Delta tfuture \in uniform(\Delta tmean - \sigma \Delta, \Delta tmean + \sigma \Delta). \quad (13)$$

An active node, especially for non-core nodes, may be involved in multiple social activities at different levels. For example, an individual may partially participate in one activity, but is fully involved in another activity. To distinguish this correlation between an active node and an activity, a transfer entropy (TE) measure is used (for a detailed description of transfer entropy refer to Thomas Schreiber, "Measuring Information Transfer" Physical Review Letters, vol. 85, No. 2, pp. 461-464, July, 2000, which is hereby incorporated by reference as though fully set forth herein).

Transfer entropy is computed from the communication signals used by active nodes. It is assumed that different social activities use different communication signals. In practice, they may not be different, but they can be encoded with different time sequences for representing different communication signals for different social activities. For two communicating sources, x(n) and y(n), the transfer entropy is a measure for information transferred from one source to the other one. The amount of information transferred from y(n) to x(n) is defined by the following equation:

$$TEy \to x = Pxn+1,xn,yn \text{ Log } P(xn+1|xn,yn)P(xn+1|xn). \quad (14)$$

The function P(x, y) is a probability function. For communication time sequences, the probability functions are estimated by the frequencies of signal occurrences. In the approach described herein, transfer entropy between core nodes and non-core nodes is used to measure information transferred from core-nodes to non-core nodes. Since core nodes are the representatives of an activity, this measure is used to define the confidence of a non-core nodes participating in a social activity. For a non-core node, n, the confidence of participating in an activity represented by a core node is computed by:

$$C = TEcore \to nTEn \to core + TEcore \to n \quad (15)$$

Since there are multiple core nodes for a given social activity, the transfer entropy used in Equation (15) is an averaged transfer entropy over all the core nodes of the activity.

(2.5) Experimental Studies

To evaluate the system for predicting malicious social activities described herein, the system was implemented in Matlab and a set of spatial-temporal network data was generated for testing the system. To generate the spatial-temporal data, first 40 different social activities were generated using a random geometric graph model. The 40 activities were generated in a geometric area with a size of 200 kilometers by 200 kilometers and were used as an activity database. Then, 90 days of social network data was generated with the following properties:

Each day randomly selects activities from the activity database; each selected activity is randomly modified in geolocation and network edges. The geolocations of the network nodes are modified by a random walk model. The network edges are randomly changed with a pre-determined probability.

The recurrence of each activity in the 90 days is modeled by a uniform distribution with a predetermined mean value. The active time of each activity is randomly selected from 8:00 am to 8:00 pm with an active duration that is uniformly distributed from 1.0 hour to 3.0 hours.

For each day, there are some isolated random nodes generated with a predetermined probability. The isolated nodes are randomly connected to their neighbor nodes.

For each activity, a communication time sequence is randomly generated with a predetermined probability that controls the sequence density/frequency. Each node in an activity gets the same (activity) communication time sequence but starting with a random delay.

For each node, there is an arrival time if it participates in an activity. The time difference between node arrival-time and activity start-time is modeled by a uniform distribution with a randomly selected mean value.

Figures 7A, 7B:
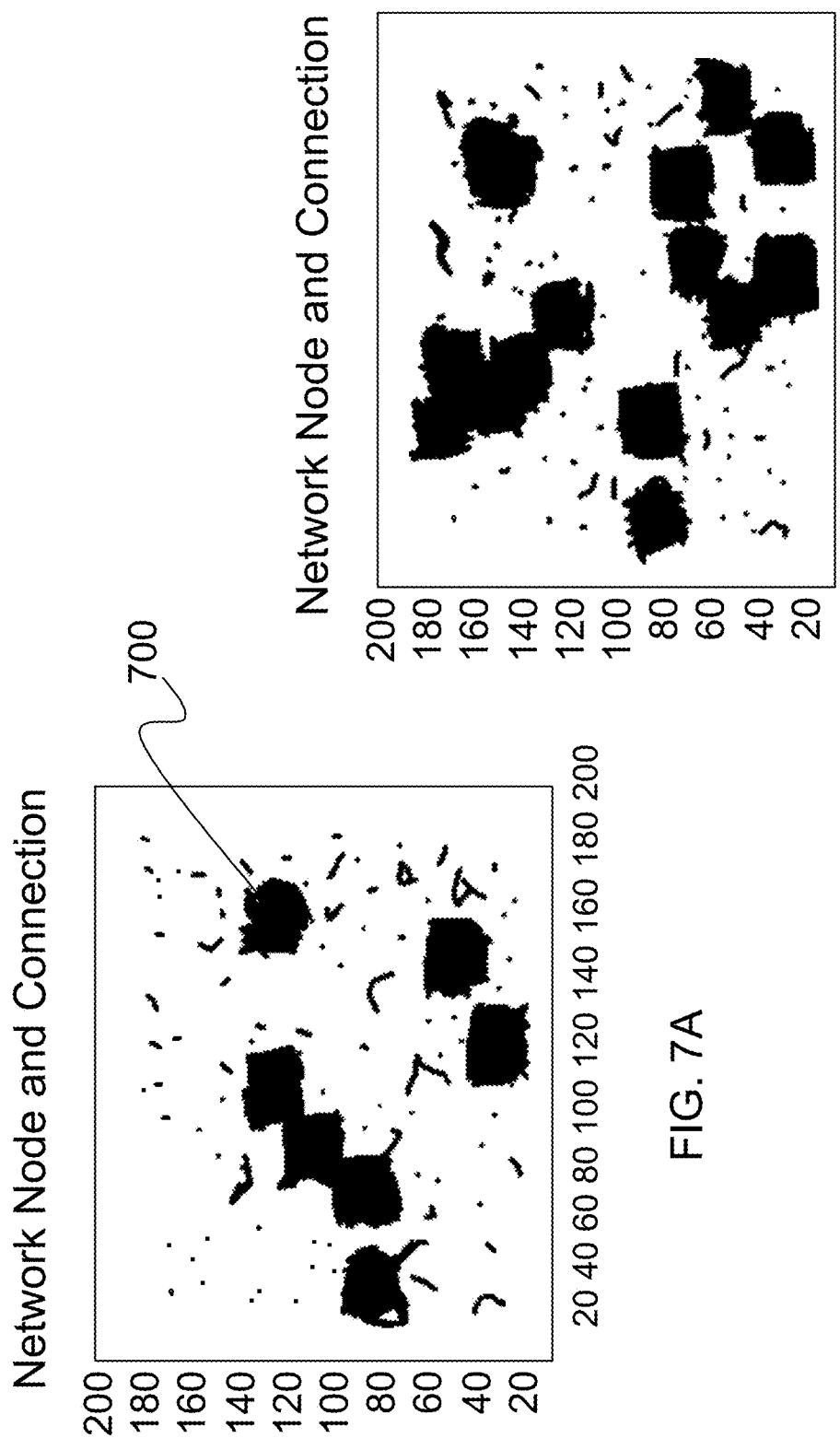
FIG. 7A illustrates a first example of one-day network data showing network nodes and connections according to some embodiments of the present disclosure.
FIG. 7B illustrates a second example of one-day network data showing network nodes and connections according to some embodiments of the present disclosure.
Figure 7C:
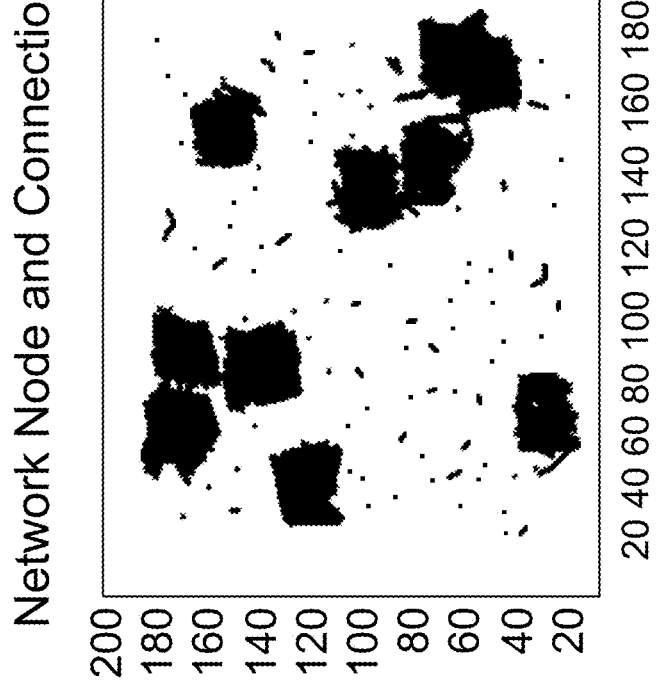
FIG. 7C illustrates a third example of one-day network data showing network nodes and connections according to some embodiments of the present disclosure.
Figure 8A:
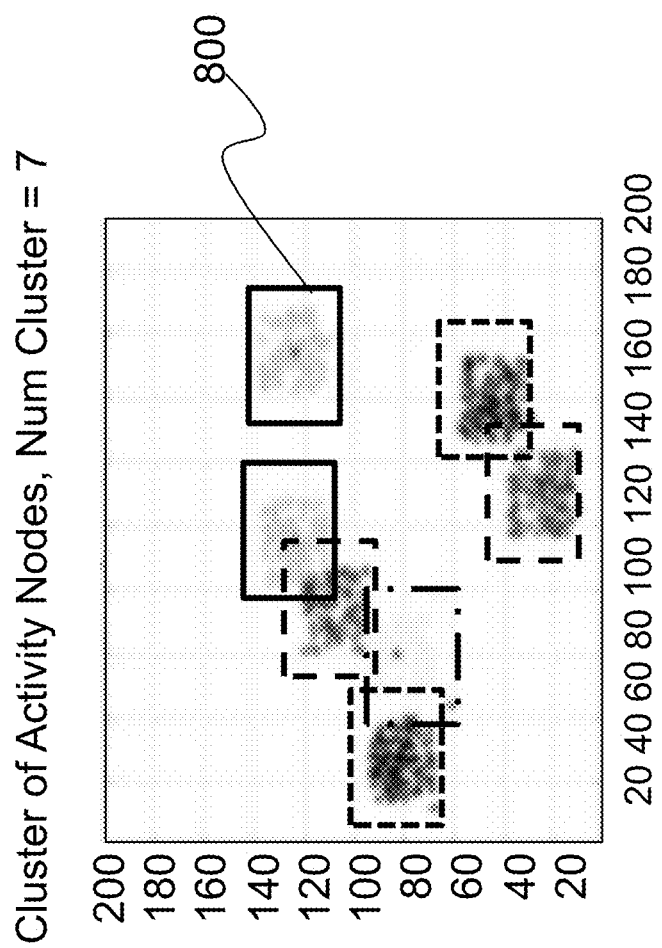
FIG. 8A illustrates extracted activities from the first example of one-day network data in FIG. 7A according to some embodiments of the present disclosure.
Figure 8B:
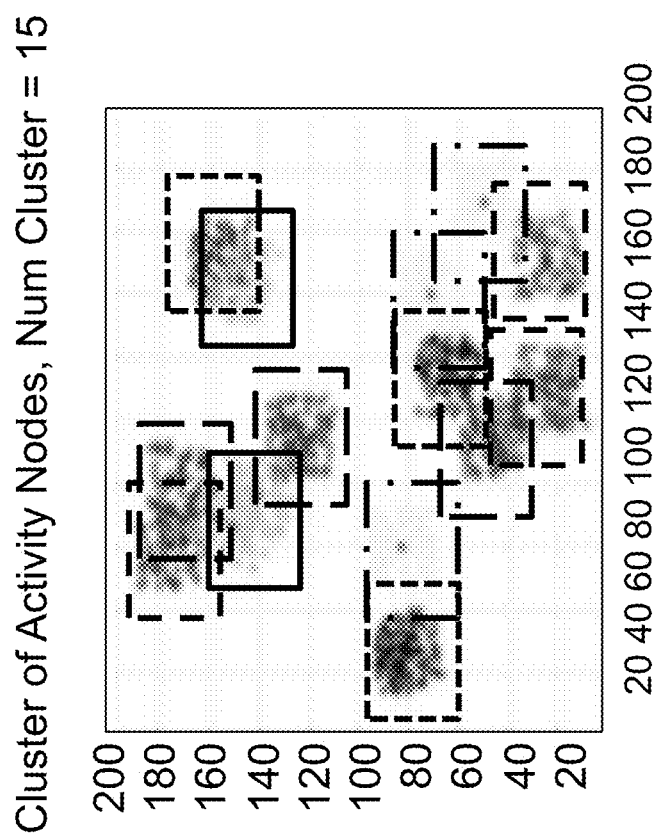
FIG. 8B illustrates extracted activities from the second example of one-day network data in FIG. 7B according to some embodiments of the present disclosure.
Figure 8C:
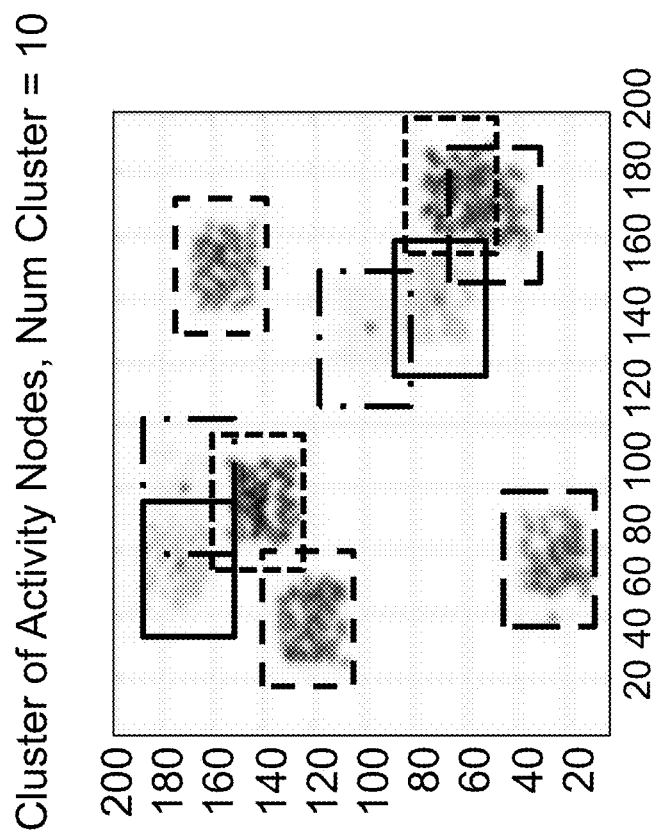
FIG. 8C illustrates extracted activities from the third example of one-day network data in FIG. 7C according to some embodiments of the present disclosure.

FIGS. 7A-7C depict three examples of one-day network data with network nodes and edges. One-day data also contains isolated random nodes and edges. Some activities may partially overlap in their geolocations. The first 60-days of the network data was used to build core-representations (depicted as clusters of data points (e.g., element 700)) for the 40 activities and produce the predictions of the activities. The remaining 30-day network data was used to evaluate the effectiveness of the predictions. With the simulated network data, activities were extracted from the daily data using the technique shown in FIG. 5. Some samples of extracted activities corresponding to the one-day network data in FIGS. 7A-7C are illustrated in FIGS. 8A-8C, respectively. In FIGS. 8A-8C, each cluster (e.g., element 800) outlined by a box having a different line pattern represents a different activity. The technique according to embodiments of the present disclosure is able to extract activities from daily network data.

Figure 9:
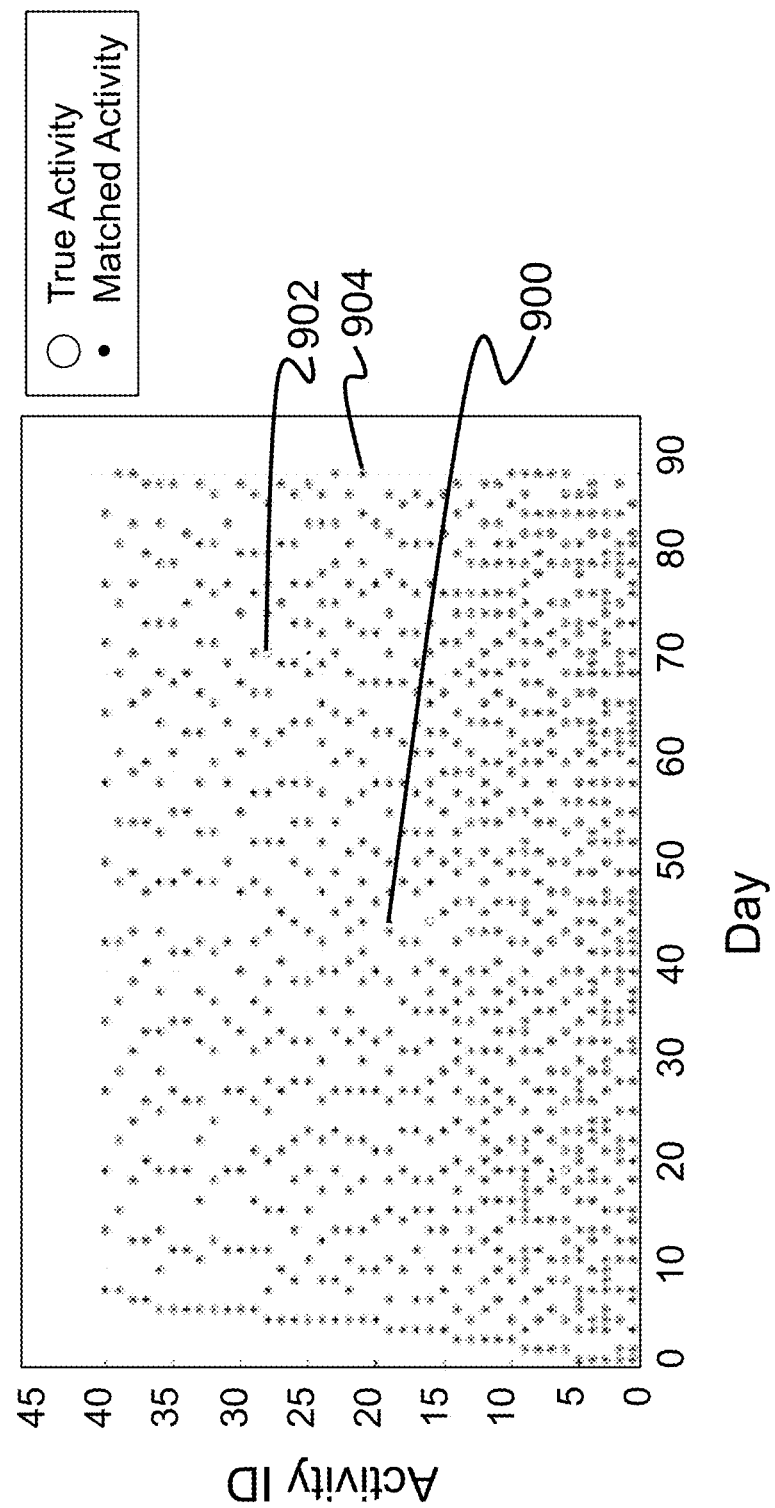
FIG. 9 illustrates the result of matching all activities over 90 days according to some embodiments of the present disclosure.

After extracting activities from daily network data, the activity matching techniques illustrated in FIG. 5 were applied to matching all activities over 90 days. FIG. 9 shows the result of matching all activities over 90 days. The vertical axis is activity IDs, and the horizontal axis is days (90 days). The filled dots (e.g., element 900) represent a matched activity while the circles (e.g., element 902) represent the ground truth. It is a correct match only if one dot is overlapped with a circle (e.g., element 904). There are total 950 activity occurrences in 90 days, and the technique described herein correctly matched 944 activities, producing a matching accuracy of 944/950=99.37%.

Figure 10:
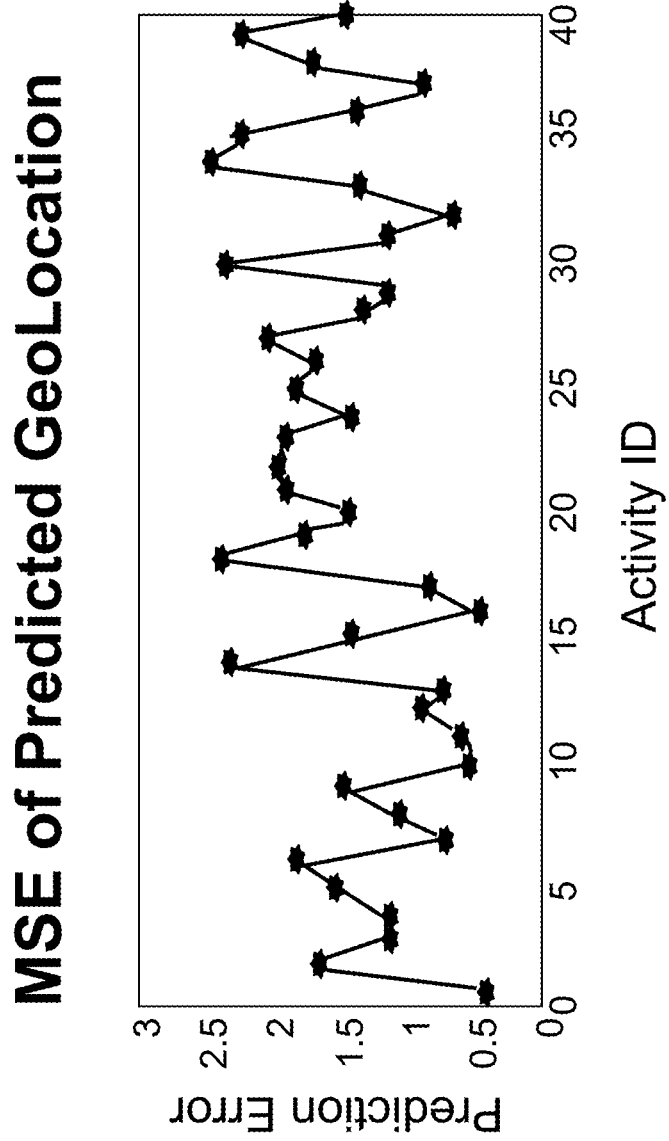
FIG. 10 illustrates geolocation prediction error of 40 activities according to some embodiments of the present disclosure.
Figure 11A:
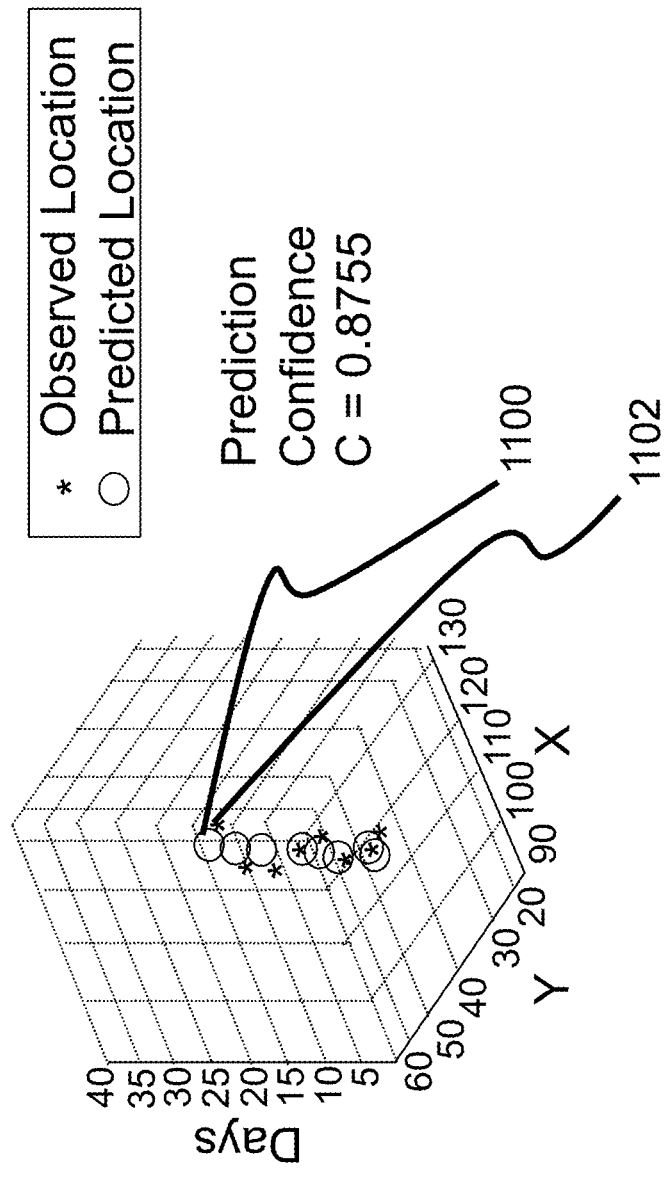
FIG. 11A illustrates geolocation prediction of a first active node according to some embodiments of the present disclosure.
Figure 11B:
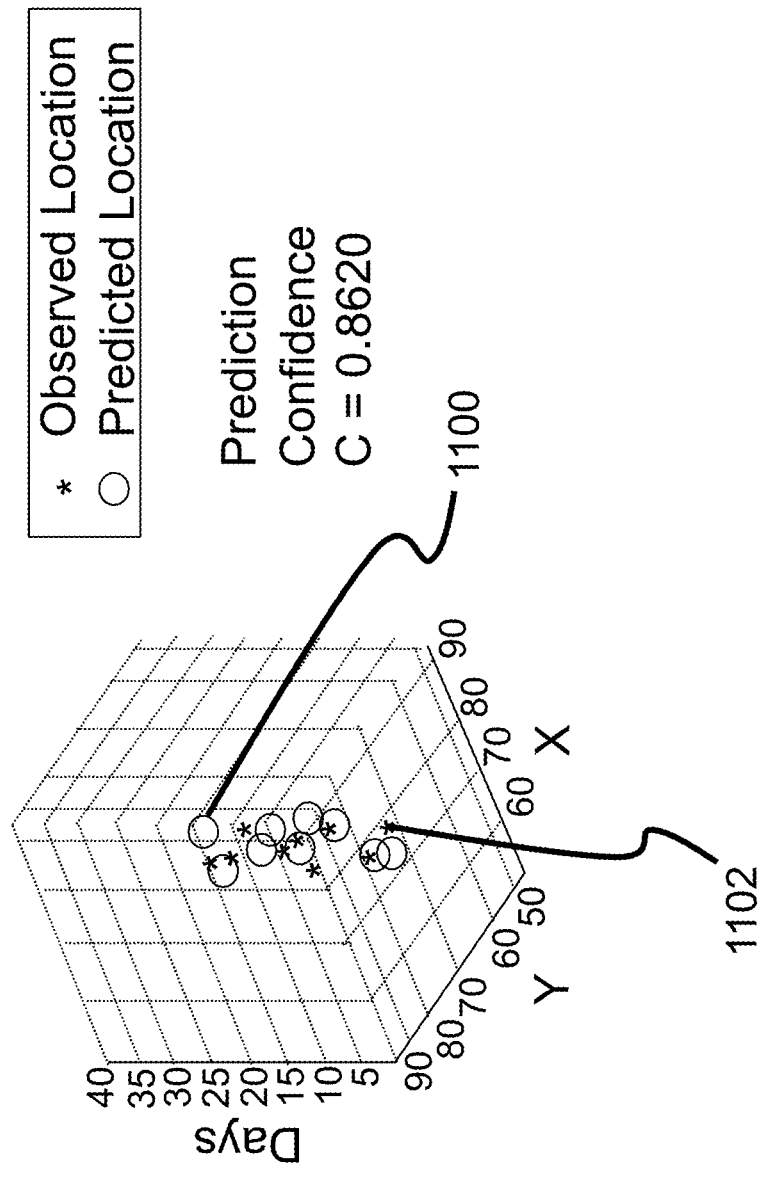
FIG. 11B illustrates geolocation prediction of a second active node according to some embodiments of the present disclosure.

For each activity, there is a geolocation center, which is basically the cluster center. To predict future geolocation center for each activity, Equations (9) through (11) were applied to predict activity geolocations at a predetermined point in the future. In this case, the predicted activity geolocations were 30 days in the future. The 30-day network data was used to compute prediction errors. The Mean Squared Error (MSE) errors of activity geolocation prediction for the 40 activities is summarized in FIG. 10. For all 40 activities, the MSE errors of activity geolocation prediction is less than 2.5 kilometers. Individual node geolocation prediction was tested with Equations (9) through (11). FIGS. 11A and 11B depict two examples of individual node geolocation prediction, where the circles (e.g., element 1100) are the predicted geolocations and the stars (e.g., element 1102) are the observed locations. The prediction confidences of the predictions are calculated using the transfer entropy method described in Equation (15). Individual node (person) arrival time to an activity is an important information for tracking the movement of a person of interest. In evaluating the prediction of individual node arrival-time, for every activity, the time difference between individual arrival time and activity start-time for all core-nodes is predicted and an averaged prediction error for the activity is used.

Figure 12:
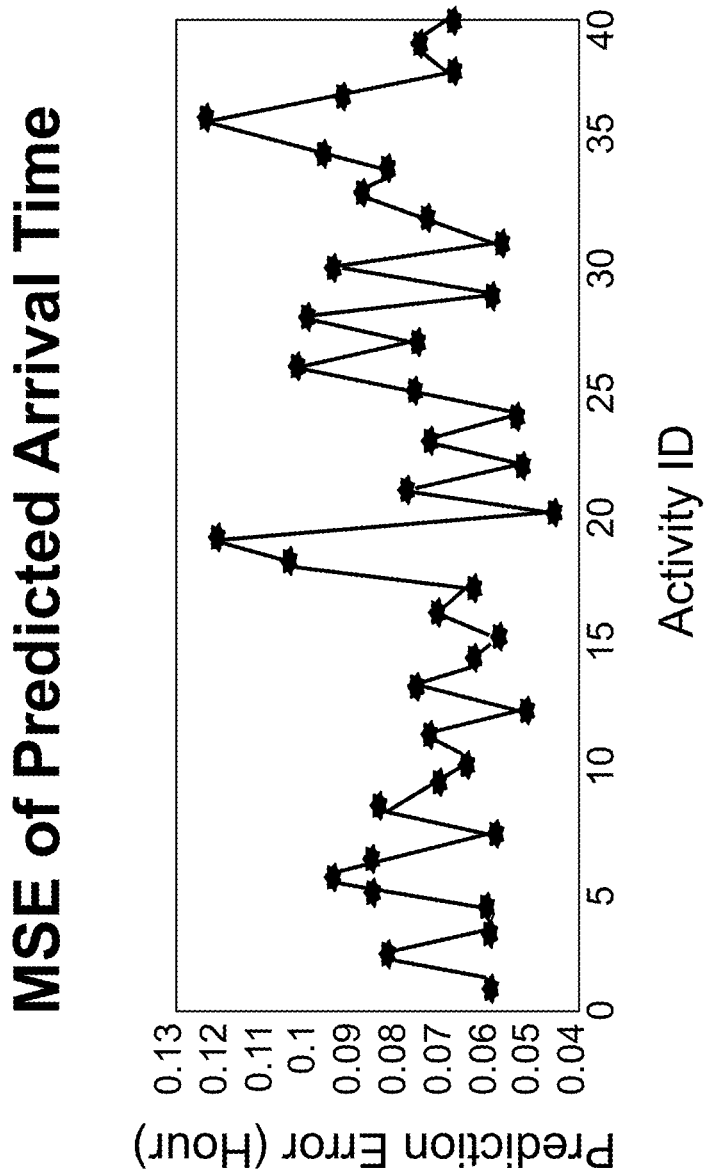
FIG. 12 illustrates time difference prediction for all activities according to some embodiments of the present disclosure.
Figure 13C:
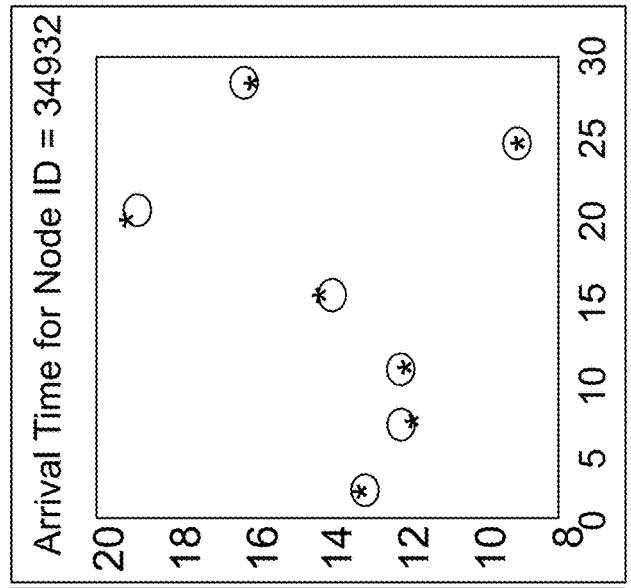
FIG. 13C illustrates arrival time prediction of a third active node according to some embodiments of the present disclosure.
Figure 13B:
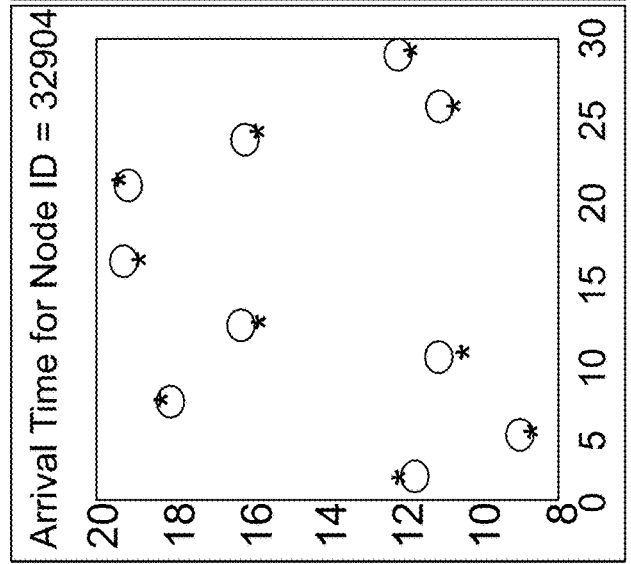
FIG. 13B illustrates arrival time prediction of a second active node according to some embodiments of the present disclosure.
Figure 13A:
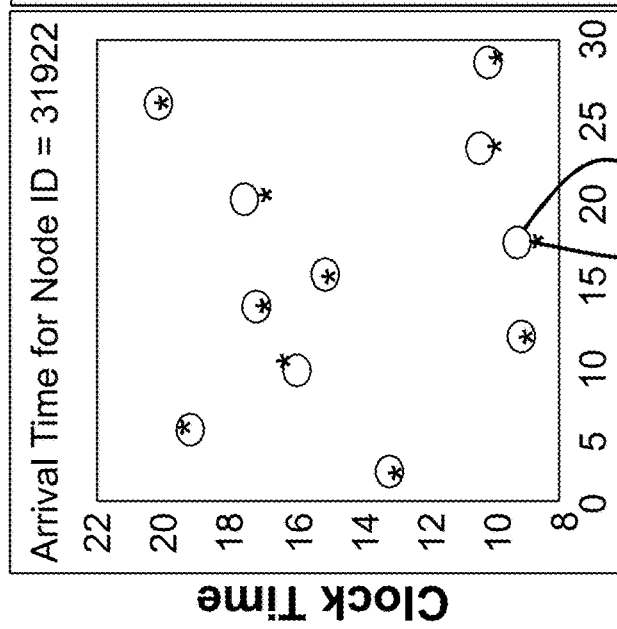
FIG. 13A illustrates arrival time prediction of a first active node according to some embodiments of the present disclosure.

FIG. 12 shows the prediction errors for all activities. For the 40 activities, averaged prediction errors of arrival time difference are less than 0.13 hour<8 minutes, which means our approach is effective in the prediction. FIGS. 13A-13C illustrate some examples of predicted arrival times and observed times (observed in the 30-day data) for three individual nodes. The circles (e.g., element 1300) represent predicted times and the stars (e.g., element 1302) represent observed times, and they are very close.

The invention described herein can be utilized in network data analysis and surveillance. For example, the activity analysis/prediction system can be used to monitor criminal activity (e.g., drug dealer activity) in a given region. In this example, the outputs of the system is activity information related to recent drug dealer activities and the prediction of future drug dealer activities in the given region. The activity information includes the location, time, and participated persons of the activities. The system described herein is able to identify social activities (social gathering) that occurred in the given region by analyzing the input social network data (element 400). With the information of suspected persons, the system is able to identify possible malicious activities (e.g., drug dealer's activities), in which the suspected persons participated and provide alarms/alerts of the recent drug dealer activities to the law enforcement. With several months of social network data, the system is able to construct the core representation (element 402) of the drug dealer's activities and obtain the statistics (element 404) of the activities. With the statistics, the system is able to predict the future activities of the drug dealers as described by Equations 5 through 13. The system is able to provide alarms of future drug dealer activities to the law enforcement.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for predicting social activity, the system comprising:
   one or more processors and a non-transitory computer-readable medium having executable instructions encoded thereon such that when executed, the one or more processors perform operations of:
      extracting social activities from a set of spatial-temporal social network data collected in a first time period ranging from hours to days to capture spatial structures of social activities in a graph network representation,
      wherein the social activities are represented by clusters of nodes and connecting edges in the graph network representation;
      applying a graph matching technique over a set of spatial-temporal social network data collected in a second time period ranging from weeks to months to capture temporal structures of the social activities;
      representing a spatial-temporal structure of each social activity as an activity core, wherein each activity core is defined as a set of active nodes that participate in the social activity with a frequency over a predetermined threshold over the second time period;
      for each activity core, computing statistics of the social activity;
      using the computed statistics to generate a prediction of future behaviors of the social activity; and
      generating and transmitting an alert regarding the prediction of future behaviors of the social activity.

2. The system as set forth in claim 1, wherein the nodes of each cluster have similar active time periods and geolocations.

3. The system as set forth in claim 1, where in applying the graph matching technique, the one or more processors further perform operations of:
   matching edges between a pair of clusters;
   computing an edge matching score for all matched edges; and
   determining if the pair of clusters are matched by applying a thresholding technique.

4. The system as set forth in claim 1, where in representing the spatial-temporal structure of each social activity, the one or more processors further perform operations of:
   computing a participation profile for each active node within a cluster; and
   determining active nodes for the activity core by thresholding the participation profiles,
   wherein for an active node, its participation profile pi is computed according to the following:

$$pi = mi M$$

where mi denotes a number of times in which the active node participates in the social activity, and M is a total number of times that the social activity occurs in the second time period.

5. The system as set forth in claim 1, where in generating the prediction of future behaviors of the social activity, the one or more processors generate a prediction of where and when the social activity will occur.

6. The system as set forth in claim 1, wherein the predicted social activity is a malicious activity, and wherein the prediction is used by law enforcement to determine actions to take to prevent the malicious activity.

7. A computer implemented method for predicting social activity, the method comprising an act of:
   causing one or more processors to execute instructions encoded on a non-transitory computer-readable medium, such that upon execution, the one or more processors perform operations of:
      extracting social activities from a set of spatial-temporal social network data collected in a first time period ranging from hours to days to capture spatial structures of social activities in a graph network representation,
      wherein the social activities are represented by clusters of nodes and connecting edges in the graph network representation;
      applying a graph matching technique over a set of spatial-temporal social network data collected in a second time period ranging from weeks to months to capture temporal structures of the social activities;
      representing a spatial-temporal structure of each social activity as an activity core, wherein each activity core is defined as a set of active nodes that participate in the social activity with a frequency over a predetermined threshold over the second time period;
      for each activity core, computing statistics of the social activity;
      using the computed statistics to generate a prediction of future behaviors of the social activity; and
      generating and transmitting an alert regarding the prediction of future behaviors of the social activity.

8. The method as set forth in claim 7, wherein the nodes of each cluster have similar active time periods and geolocations.

9. The method as set forth in claim 7, where in applying the graph matching technique, the one or more processors further perform operations of:

matching edges between a pair of clusters;
computing an edge matching score for all matched edges; and
determining if the pair of clusters are matched by applying a thresholding technique.

10. The method as set forth in claim 7, where in representing the spatial-temporal structure of each social activity, the one or more processors further perform operations of:
computing a participation profile for each active node within a cluster; and
determining active nodes for the activity core by thresholding the participation profiles,
wherein for an active node, its participation profile pi is computed according to the following:

$$pi = miM$$

where mi denotes a number of times in which the active node participates in the social activity, and M is a total number of times that the social activity occurs in the second time period.

11. The method as set forth in claim 7, where in generating the prediction of future behaviors of the social activity, the one or more processors generate a prediction of where and when the social activity will occur.

12. The method as set forth in claim 7, wherein the predicted social activity is a malicious activity, and wherein the prediction is used by law enforcement to determine actions to take to prevent the malicious activity.

13. A computer program product for predicting social activity, the computer program product comprising:
computer-readable instructions stored on a non-transitory computer-readable medium that are executable by a computer having one or more processors for causing the processor to perform operations of:
extracting social activities from a set of spatial-temporal social network data collected in a first time period ranging from hours to days to capture spatial structures of social activities in a graph network representation,
wherein the social activities are represented by clusters of nodes and connecting edges in the graph network representation;
applying a graph matching technique over a set of spatial-temporal social network data collected in a second time period ranging from weeks to months to capture temporal structures of the social activities;
representing a spatial-temporal structure of each social activity as an activity core, wherein each activity core is defined as a set of active nodes that participate in the social activity with a frequency over a predetermined threshold over the second time period;
for each activity core, computing statistics of the social activity;
using the computed statistics to generate a prediction of future behaviors of the social activity; and
generating and transmitting an alert regarding the prediction of future behaviors of the social activity.

14. The computer program product as set forth in claim 13, wherein the nodes of each cluster have similar active time periods and geolocations.

15. The computer program product as set forth in claim 13, where in applying the graph matching technique, the one or more processors further perform operations of:
matching edges between a pair of clusters;
computing an edge matching score for all matched edges; and
determining if the pair of clusters are matched by applying a thresholding technique.

16. The computer program product as set forth in claim 13, where in representing the spatial-temporal structure of each social activity, the one or more processors further perform operations of:
computing a participation profile for each active node within a cluster; and
determining active nodes for the activity core by thresholding the participation profiles,
wherein for an active node, its participation profile pi is computed according to the following:

$$pi = miM$$

where mi denotes a number of times in which the active node participates in the social activity, and M is a total number of times that the social activity occurs in the second time period.

17. The computer program product as set forth in claim 13, where in generating the prediction of future behaviors of the social activity, the one or more processors generate a prediction of where and when the social activity will occur.

18. The computer program product as set forth in claim 13, wherein the predicted social activity is a malicious activity, and wherein the prediction is used by law enforcement to determine actions to take to prevent the malicious activity.

* * * * *